Figure 2:
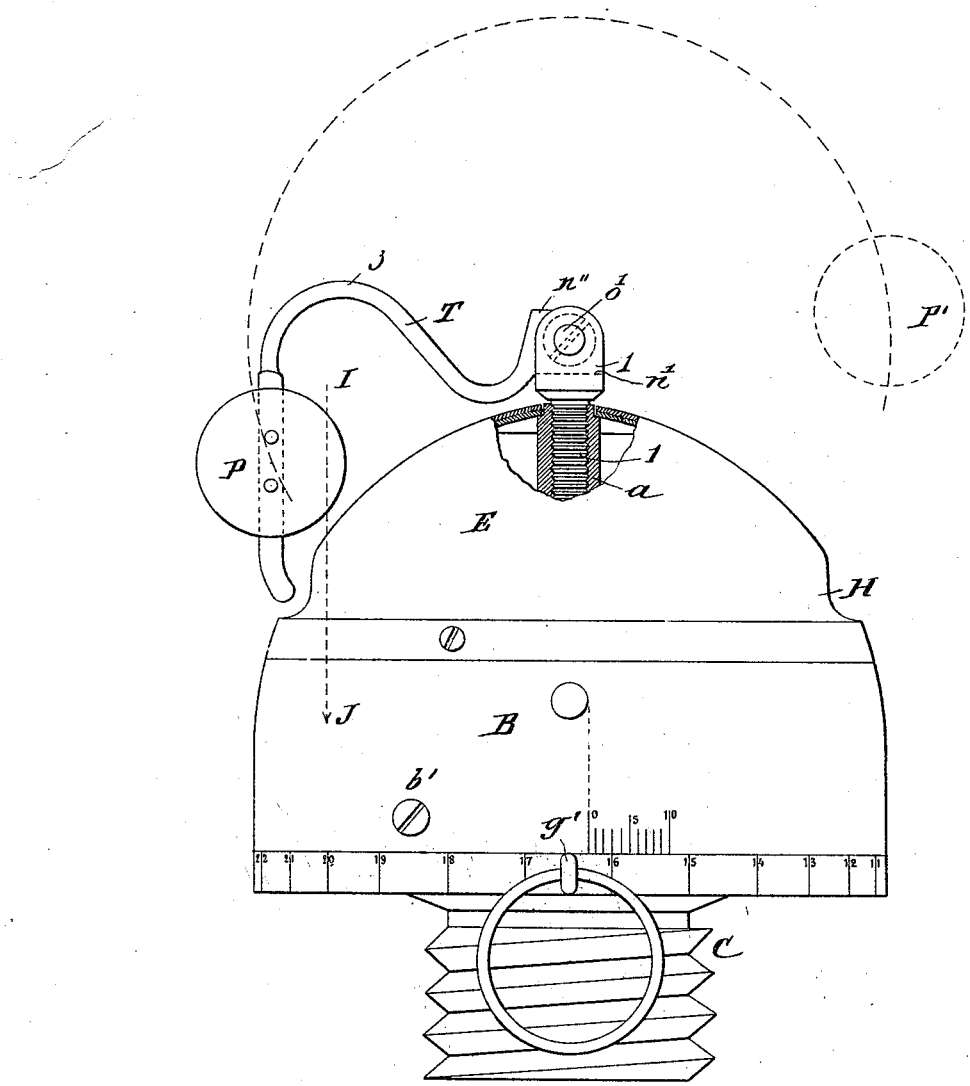

(No Model.) 5 Sheets—Sheet 1.
F. MAUBEUGE.
DOUBLE ACTING MECHANICAL FUSE.
No. 565,172. Patented Aug. 4, 1896.
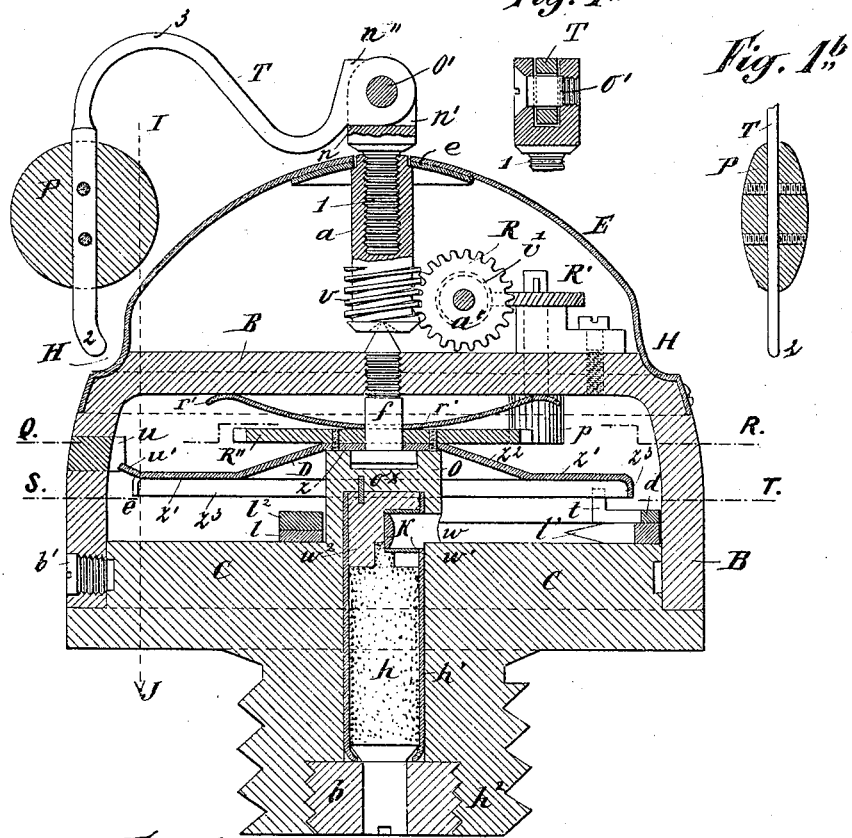
Fig. 1.
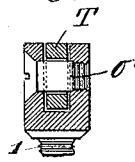
Fig. 1ᵃ.
Fig. 1ᵇ.
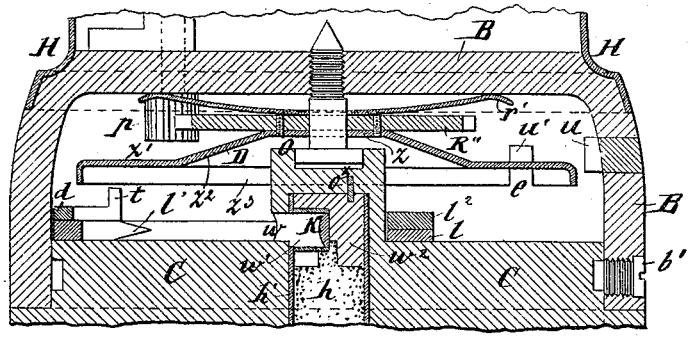
Fig. 3.
Witnesses.
Fred S. Greenleaf.
Thomas F. Drummond.
Inventor.
Félicien Maubeuge.
by Crosby & Gregory.
attys.

(No Model.) 5 Sheets—Sheet 2.
F. MAUBEUGE.
DOUBLE ACTING MECHANICAL FUSE.

No. 565,172. Patented Aug. 4, 1896.

(No Model.) 5 Sheets—Sheet 3.
F. MAUBEUGE.
DOUBLE ACTING MECHANICAL FUSE.
No. 565,172. Patented Aug. 4, 1896.
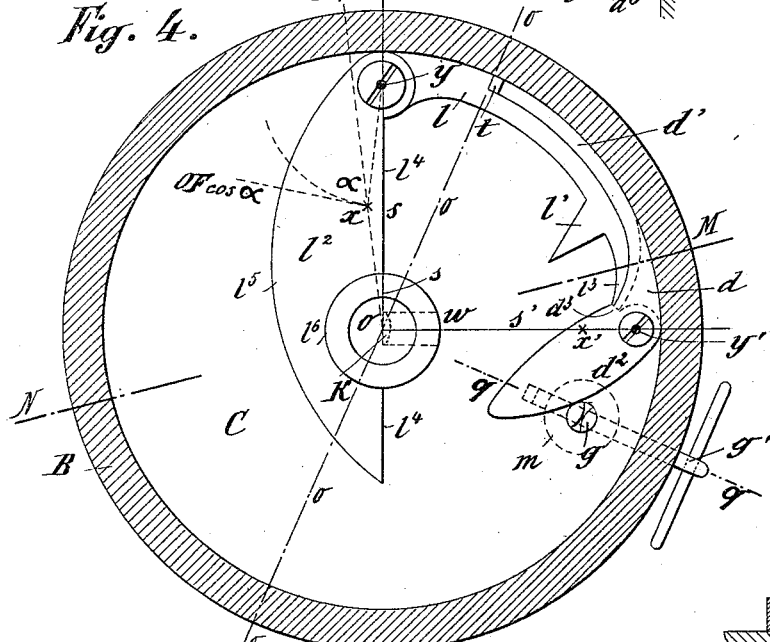
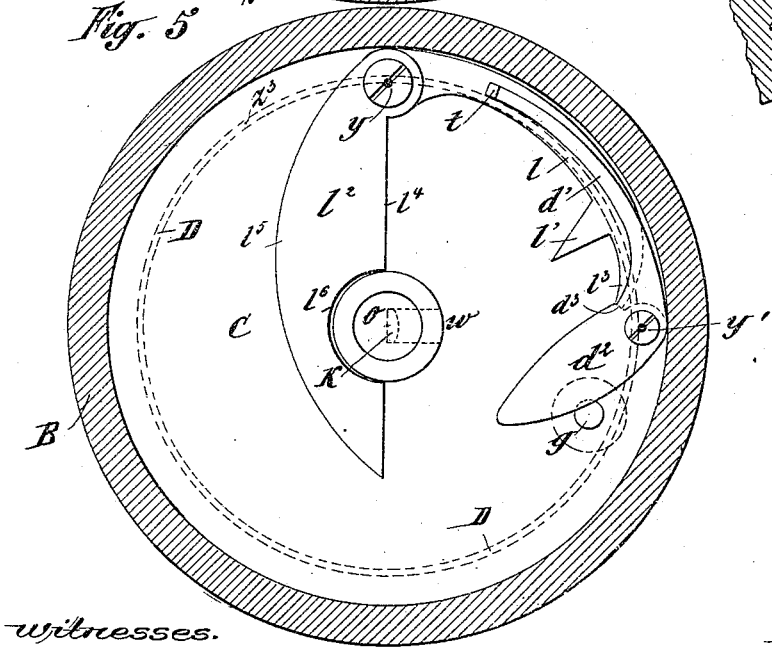
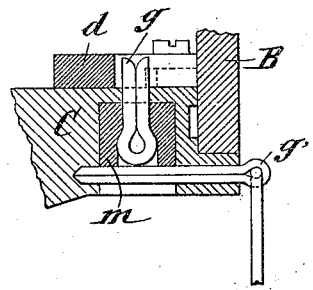
Witnesses.
Fred S. Greenleaf.
Thomas F. Drummond.
Inventor
Félicien Maubeuge.
by Crosby & Gregory
attys.

(No Model.) 5 Sheets—Sheet 4.
F. MAUBEUGE.
DOUBLE ACTING MECHANICAL FUSE.

No. 565,172. Patented Aug. 4, 1896.

Witnesses.
Fred S. Greenleaf.
Thomas J. Drummond.

Inventor
Félicien Maubeuge.
by Crosby & Gregory
Attys.

(No Model.) 5 Sheets—Sheet 5.

F. MAUBEUGE.
DOUBLE ACTING MECHANICAL FUSE.

No. 565,172. Patented Aug. 4, 1896.

Witnesses.
Fred S. Greenleaf.
Thomas J. Drummond.

Inventor.
Féticien Maubeuge.
by Crosby & Gregory.
Attys.

UNITED STATES PATENT OFFICE.

FÉLICIEN MAUBEUGE, OF TERMONDE, BELGIUM.

DOUBLE-ACTING MECHANICAL FUSE.

SPECIFICATION forming part of Letters Patent No. 565,172, dated August 4, 1896.

Application filed September 17, 1894. Serial No. 523,176. (No model.) Patented in Belgium February 10, 1893, No. 103,400, and December 29, 1893, No. 107,836; in France May 30, 1893, No. 230,481; in Italy August 10, 1893, No. 34,645; in Spain September 30, 1893, No. 14,794; in Austria-Hungary October 11, 1893, No. 29,395 and No. 54,366; in Canada January 10, 1894, No. 46,152; in Switzerland January 30, 1894, No. 8,691; in England January 31, 1894, No. 2,144; in Germany February 12, 1894, No. 81,247, and in Norway February 12, 1894, No. 3,538.

*To all whom it may concern:*

Be it known that I, FÉLICIEN MAUBEUGE, major in the Belgian artillery, residing at Termonde, in the Kingdom of Belgium, have invented a new and useful Double-Acting Mechanical Fuse, (for which I have received patents in Belgium, dated February 10, 1893, No. 103,400, and December 29, 1893, No. 107,836; in England, provisional, dated January 31, 1894, No. 2,144; in Switzerland, dated January 30, 1894, No. 8,691; in Germany, dated February 12, 1894, No. 81,247; in France, dated May 30, 1893, No. 230,481; in Canada, dated January 10, 1894, No. 46,152; in Austria-Hungary, dated October 11, 1893, No. 29,395 and No. 54,366; in Spain, dated September 30, 1893, No. 14,794; in Norway, dated February 12, 1894, No. 3,538, and in Italy, dated August 10, 1893, No. 34,645,) of which the following is a specification, reference being had therein to the accompanying drawings.

My invention relates to fuses in which the rotation of the projectile around a spindle prevented from partaking of this rotation is utilized for producing the movement of a mechanism which causes the disengagement of the percussion apparatus, the object being to produce a combined time and percussion fuse which shall be absolutely sure and precise in its action, easily manipulated by any ordinary soldier, and free from danger during transport, storage, and firing, and which can be kept for any length of time.

The combined time and percussion fuse consists partly of a percussion apparatus, the parts of which are arranged pivotwise in a plain perpendicular to the longitudinal axis of the fuse, so as to utilize for their operation the centrifugal force of their own mass produced by the rotation of the projectile when discharged, and consequently to dispense with a percussion-spring in mechanical fuses when possible, the percussion apparatus being maintained in an inoperative condition and prevented from being released until the fuse rotates at a sufficiently high velocity, that is to say, until the projectile has been discharged.

My invention consists, further, in the combination, with such a percussion apparatus, of a disengaging device arranged to rotate, and at the same time slide in the direction of the longitudinal axis of the fuse, thus giving a practically certain double action; also of a removable cartridge, the priming of which can only be reached laterally and by a pointed instrument, and, finally, of a suitable arrangement of the parts of the percussion apparatus and of the disengaging mechanism, so as to avoid any injurious effect upon the said parts by the impulse communicated to the projectile, the whole being arranged and combined substantially as hereinafter described and claimed.

To enable my invention to be fully understood, I will describe the same by reference to the accompanying drawings, in which—

Figure 6:
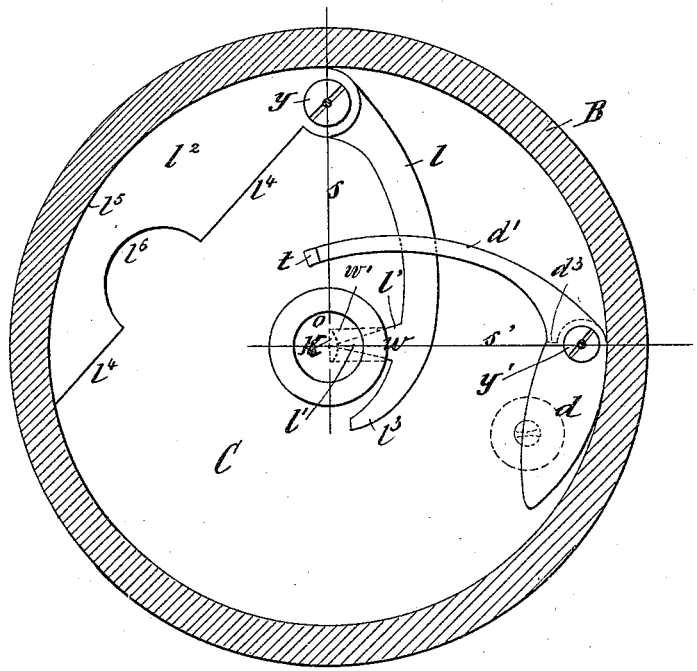
Figure 7:
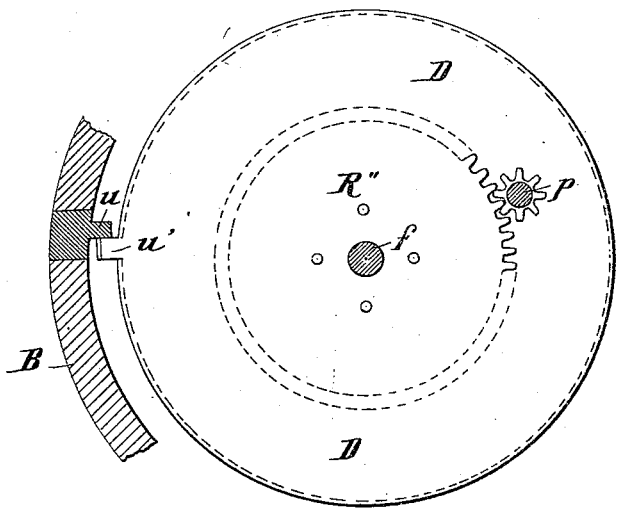
Figure 8:
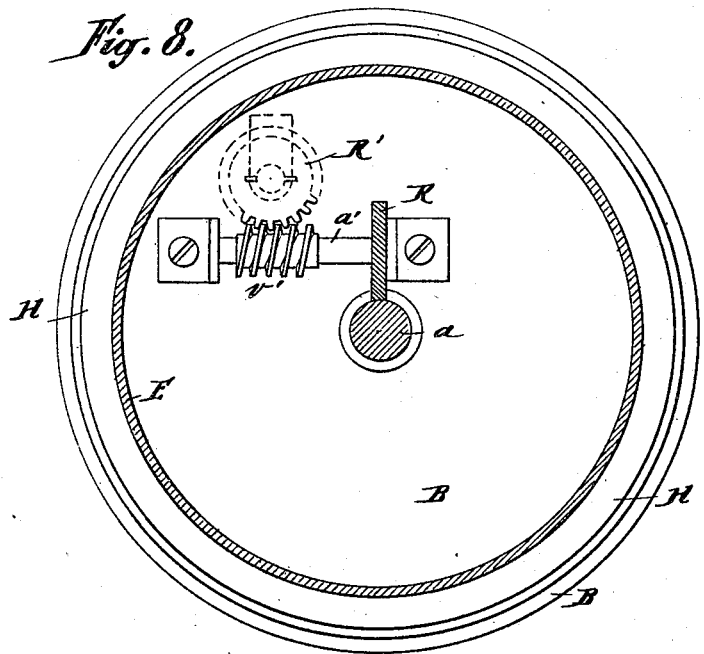
Figure 9:
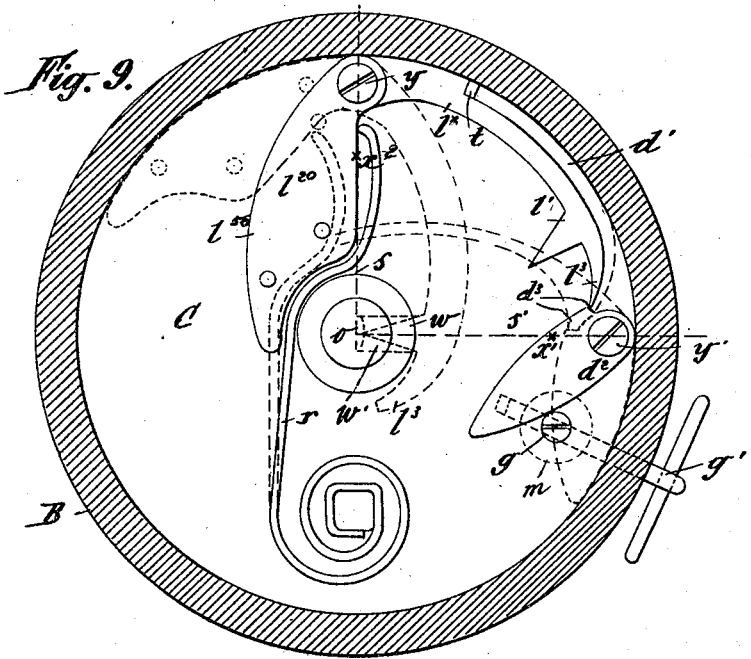

Figure 1 is a vertical section upon the line M N, Fig. 4, the fuse being at rest. Figs. 1ᵇ and 1ᶜ are sectional views of the arrangement which I preferably employ for preventing the spindle of the fuse partaking of the rotation of the projectile. Fig. 2 is a side elevation of the fuse. Fig. 3 is a vertical section of a part of a fuse similar to that shown in Fig. 1, but showing the disengaging arrangement in the position which it occupies at the moment of the projectile striking the ground or an object. Fig. 4 is a horizontal section on the line S T of Fig. 1, showing a plan of the percussion apparatus in the cocked or set position. Fig. 4ᵇ is a section on the line q q, Fig. 4, showing the details of the safety arrangement. Fig. 4ᶜ is an elevation of the parts of the percussion apparatus. Fig. 5 is a horizontal section similar to Fig. 4, showing the parts of the percussion apparatus in the position of partial disengagement after the discharge of the projectile. Fig. 6 is a horizontal section showing the parts of the percussion apparatus in the position which they occupy at the moment the projectile strikes an object or the ground. Fig. 7 is a horizontal section on the line Q R of Fig. 1. Fig. 8 is a plan of the fuse with the cap and spindle shown in section; and Fig. 9 is a plan showing a modification of the arrangement of the percussion apparatus, the full lines showing the set or cocked position and the dotted lines the position of the parts after the fuse has struck a body or the ground.

As shown in the drawings, the combined time and percussion fuse comprises a body C, a chamber or case B, and a cap E, connected together by screws. These parts constitute the frame of the fuse and form two compartments, in which are arranged the parts of the mechanical movement and of the percussion apparatus.

On the floor of the body C, Figs. 1, 3, 4, 5, and 6, is arranged the percussion apparatus, which constitutes one of the essential elements of my invention. This apparatus comprises a striker $l$, adapted to pivot on a spindle $y$ in a plane perpendicular to the longitudinal axis of the fuse. This striker has the form of a two-armed lever, one arm of which is provided with a point d projection $l'$ and the other with a weight $l^2$ of dense metal, so that in the set position, Fig. 4, the center of gravity $x$ of the striker is outside the radius $s$ of the fuse, passing through its axis of rotation $y$ and on that side of the radius which is opposite the pointed projection $l'$. By this arrangement I can utilize for the operation of the striker the centrifugal force which is produced by the rotation of the projectile on its axis when it is discharged. The projection $l'$ is projected by this force toward the center to explode the charge. The end $l^3$ of the arm carrying the projection can engage in a notch $d^3$ of a sear $d$, intended to retain the striker in the set or cocked position and to disengage it at the required moment, Figs. 4, 5, and 6. This sear pivots on an axis $y'$. Its plane of oscillation is also perpendicular to the longitudinal axis of the fuse, but its mass is so disposed that its center of gravity $x'$, when in the set or cocked position, Fig. 4, is on the radius $s'$ of the fuse which passes through the center of rotation $y'$ of the sear, that is to say, in such a manner that the said sear is in centrifugal equilibrium before the rotation of the projectile.

In order to prevent the axes of rotation $y$ and $y'$ of the striker $l$ and of the sear $d$ or those parts themselves from becoming broken or damaged from the effect of the inertia called into play at the moment of the discharge of the projectile, I have arranged these parts $l$ and $d$ to pivot flatwise on the floor of the body C, whereby they rest on or are supported by the said floor. Thus at the moment the projectile is discharged the striker $l$ and the sear $d$ are entirely supported by the body C. In order to obtain with this particular arrangement of the percussion apparatus the longest stroke possible for the striker, the axes of rotation $y$ and $y'$ of the striker $l$ and sear $d$, respectively, are arranged upon the circumference of the floor of the body C, and these parts $l$ and $d$ have a cranked or bent form corresponding to the two extreme positions, Figs. 4 and 6, that the said parts, particularly the striker, are to occupy against the inner surface of the chamber B of the fuse. As above described, in order to utilize centrifugal force for operating the striker the mass of this latter is disposed in such a manner that its center of gravity $x$ falls, in the cocked or set position of the striker, Fig. 4, outside the radius $s$ of the fuse, which passes through its axis of rotation $y$ and on the side of this radius opposite the projection $l'$.

To enable the center of gravity $x$ of the striker to be placed in a suitable position, to be determined according to the force required for a given speed of rotation, I form the arm or heel $l^2$ of the striker so as to present a maximum surface corresponding to the maximum stroke to be given to the striker. For this purpose the arm $l^2$ of the striker is formed on one side by a straight line $l^4$, which, when the device is in its set or cocked position, Fig. 4, is coincident with the radius $s$. The other side of the said arm is formed by an arc of a circle $l^5$, the center of which is the point of projection $l'$ of the striker.

The arm $l^2$ of the striker is formed with a semicircular recess $l^6$, adapted to bear against the periphery of a central projection or boss O on the floor of the body C of the fuse when the striker is in its set or cocked position.

Although the percussion apparatus above described offers no danger when the fuse is not in motion, it is advantageous to provide it with a special safety arrangement by means of which it can be locked in the cocked or set position, thus constituting not only an extra precaution, but also allowing of more readily regulating the time mechanism or the disengagement of the fuse. The arrangement which I employ for this purpose comprises a safety-pin $g$, Figs. 4 and $4^b$, placed in a plug $m$, Fig. $4^b$, the said plug being held in position by a pin $g'$, which is not withdrawn until the moment of firing.

When the fuse is at rest, the pin $g$ holds in position the heel $d^2$ of the sear $d$, the notch $d^3$ of which holds the end $l^3$ of the striker, and thereby locks the latter in the cocked or set position.

An arm $d'$ of the sear $d$ is provided with a stud or catch $t$, which, after the discharge of the projectile, comes in contact with a flange of a disk or plate D, as shown in Figs. 1 and 5, after the safety-pin $g$ has been, as will be hereinafter described, withdrawn by the discharge of the projectile whereby the arm $d^2$ of the sear is disengaged. The said disk D constitutes my double-acting disengaging arrangement and is operated by the mechanism mounted in the chamber B, Figs. 1, 2 and 8. Figs. 1, $1^b$, $1^c$, and 2 of the annexed drawings represent this latter arrangement. It comprises a weight P, fixed to a flexible rod T, pivoted by means of a pin $o'$ to a screw 1, screwed into a spindle $a$, which can rotate the parts of the percussion apparatus supported flatwise on the floor of the body C or upon the disengaging arrangement supported upon the central boss O.

The projectile being caused to rotate by the rifling of the gun, the component $O\,F\cos$ of the centrifugal force $O\,F$, produced by this rotation, tends to cause the projection $l'$ of the striker $l$, Fig. 4, to move toward the center O, so that the end $l^3$ of the striker pressing upon the notch $d^3$ of the sear $d$ causes the latter to turn on its pivot $y'$. The mass of the sear being at this moment in centrifugal equilibrium offers no resistance to this movement, which, however, is immediately arrested by the flange $z^3$ of the disk D, against which the stud $t$ of the sear strikes. (See Fig. 5.) The stud will rest against this flange until released therefrom. Upon the discharge of the projectile the rod T of the device T P is bent, whereby the end 2 of the same comes to rest upon the shoulder H of the fuse. The two points of support $o'$ and H prevent the rod from being broken by the force of the discharge and the fuse from being injured. As soon as the projectile has left the gun it is overtaken by the gases of combustion, which would break or tear off the device if it did not give under their pressure by turning on its pivot $o'$.

When the projectile is free from the gases of combustion, the resistance of the air forces the device into the position P or P'. It is then caused by its own weight to fall beneath the projectile in the plane of fire and remains in this position. It thus prevents the spindle $a$ from partaking of the rotation of the projectile. The rest of the mechanism turns with the fuse. The worm $r$ causes the wheel $R''$ and the disk D to turn through the medium of the wheels R and R' and the pinion $p$. These parts are arranged so as to impart to the disk D a slow and regular forward movement, which brings the notch $e$ of the disk D in front of the catch $t$. At this moment the release of the catch $t$ is effected by means of the pressure of the end $l^3$ of the striker on the notch $d^3$ of the sear, aided, to a certain extent, by the action of the centrifugal force on the heel of the sear itself, the center of gravity $x'$ of this latter being shifted after the discharge, by its slight movement from the position shown in Fig. 4 into the position shown in Fig. 5, to the side of the radius $s'$ opposite to the catch $t$. The sear thus releases the end $l^3$ of the striker $l$, the point $l'$ of which is driven by the force $O\,F\cos$ acting upon the arm $l^2$ with sufficient energy toward the center of the fuse, Fig. 6, to produce the ignition of the fulminate priming K and cause the projectile to explode.

If the fuse has been regulated for a distance greater than the range of the projectile, the latter will strike the ground or object before the release of the sear by the notch $e$. The projectile after impact continues to revolve, its velocity of translation being suddenly reduced. The disk D and the wheel $R''$ will continue to move forward (see Fig. 3) by sliding upon the spindle $f$ and thereby compressing the spring $r'$. The flange $z^3$ of the disk passes beyond the catch $t$ and, the projectile continuing to turn, the striker will be operated by centrifugal force, as above described, for firing the projectile during its flight.

In fuses intended for projectiles the speed of rotation of which is not very great I can, without departing from the principle of the present invention, effect the disengagement of the striker $l^\times$ by means of a deflected spring $r$, Fig. 9, the striker being in this case preferably constructed so that when in the cocked or set position its center of gravity $x^2$ is coincident with the radius $s$, whereby centrifugal force would have no effect upon the striker until it is set free.

In some cases I combine a spring $r$ of known force with a construction of striker and sear essentially the same as that described with reference to Fig. 4, so that the force of this spring will aid the centrifugal force in effecting the disengagement of the sear and of the striker when the projectile is discharged; but when the fuse is not in motion this spring is incapable of freeing the locking device and of causing it to operate with sufficient force to constitute it a real danger. It is advantageous, however, to employ my safety arrangement $g$, $m$, and $g'$, especially when the percussion apparatus is provided with a spring $r$, however weak it may be.

I sometimes dispense with the sear $d$ and place the catch $t$ directly on the arm of the striker which carries the projection $l'$; but the release of the catch is produced with greater facility when the intermediate part $d$ is allowed to remain, which part $d$ constitutes one of my means for suitably reducing the pressure of this catch $t$ upon the flange of the disk D.

The catch $t$ may be fixed either directly upon the heel $d^2$ of the sear or the arm $l^2$ of the striker or upon an arm attached to one of these parts, so that the said catch is supported not externally but internally upon the edge of the disk, which has in this case a smaller diameter than the disk D represented in the drawings, so as to give the catch $t$, when released, a sufficiently long stroke.

For allowing of adjusting the fuse so that it shall explode in a given time, I provide the body C with a graduated scale, Fig. 2, the zero of which is in the meridian plane, Fig. 4, passing through the releasing edge of the stud or catch $t$, Figs. 2 and 4. The releasing edge of the notch $e$ is kept in the meridian of the zero of the scale. This initial position of the disk D with the edge of the notch $e$ opposite the zero of the scale is obtained when the fuse is fitted up by placing the stop-pin $u$, Figs. 1 and 7, against the projection $u'$.

To adjust the fuse, it is only necessary to loosen the screw $b'$, locking the chamber to in a bearing $e$ in the cap E and upon the conical extremity of a spindle $f$, screwed into the bottom of the chamber B. The weight P has the form of a pendulum-bob, as shown in Fig. 1$^b$, in order to present a small surface to the gases of combustion issuing from the mouth of the cannon and to the resistance of the air during the flight of the projectile. The end 2 of the rod T is normally held out of contact with the fuse by a shoulder $n$. This method of suspending the weight P to a flexible rod, the end 2 of which can bear against the fuse, causes the device, at the moment of the discharge of the projectile, to be supported at two points on the fuse, so that an impulse may be given to the device without fear of its breaking from the effect of the inertia of the weight P.

The pivot allows of the device oscillating from P to P'. (See Fig. 2.) It is stopped at P' by shoulders $n'$ and $n''$, which prevent the part 3 of the rods from coming in contact with the fuse. Thus the force of the gases of combustion at the moment the device issues from the mouth of the cannon is absorbed by the flexibility of the rod, by the oscillation of the device, and by the resistance of the pivot.

To relieve the point of suspension as much as possible from the effect of the inertia of the device T P, and thus do away with all risk of damage to the spindle $a$, which would render it impossible to prevent the latter from partaking of the rotary movement of the projectile, I arrange for the center of gravity of the device, which is in the line I J, Figs. 1 and 2, to be as near as possible to the point of contact of the end 2 with the fuse.

The end 2 of the device extends to the chamber B, to the upper part of which the cap E is attached, this upper part being formed with a circular shoulder H, upon which the slightly-curved end 2 of the device can be supported without danger of the cap E being damaged by the shock of the weight P. A worm $v$ on the spindle $a$ drives the wheel R, the axis $a'$ of which is provided with a worm $v'$ and drives the wheel R', which by means of a pinion $p$ drives the wheel R'', fixed upon the disk or plate D and which can, with the latter, slide forward on its axis $f$. A flat spring $r'$ keeps these parts in position. The disk D comprises two plates $z$ and $z'$, connected by a truncated cone $z^2$, Figs. 1 and 3. By this construction of disk the chamber B may be formed of comparatively slight height without interfering with the movement of translation of the disk upon its axis $f$ in spite of the fact that the pinion $p$ projects into the said chamber. The plate $z$ of the disk D is fixed to the wheel R'' either by rivets or other suitable means. The plate $z'$ of the disk is provided with a flange $z^3$, against which the stud or catch $t$ of the sear $d$ may bear. The plate $z$ rests on the upper face of the central boss O, as well as upon the large head or flange of the spindle $f$, which is flush with the upper face of the boss when the chamber B is placed upon the body C, Fig. 1. By this arrangement the disk D and the wheel R'' are supported on a surface sufficiently large to enable them to withstand, without fear of damage, the shock produced by the impulse due to the discharge of the projectile. In the flange $z^2$ is a notch $e$, Figs. 1 and 3, through which the stud or catch $t$ can escape at a predetermined moment. Above this notch $e$ the disk carries a catch $u'$, adapted to bear against a projection $u$ on the chamber B, Figs. 1, 3, and 7. The notch $e$ is advantageously produced by stamping, and the tongue thus obtained is bent up to form the projection $u'$ above mentioned. When the fuse is put together, the projection $u'$ of the disk D is placed in contact with the projection $u$ of the chamber B.

The projection $l'$ of the striker is intended to puncture the fulminate priming K, Figs. 1, 3, 4, 5, and 6, of a removable cartridge $h$, which is introduced, only at the moment when the fuse is to be used, into the recess $h'$ through $h^2$, and which is held in position by a plug $b$, having a central aperture and screwed into the recess $h^2$. This priming K is located in the head or plug $w^2$ of the cartridge, Figs. 1 and 3, having a lateral aperture $w'$, corresponding to the percussion-aperture $w$, formed laterally in the central projection or boss O, Figs. 1, 3, 4, 5, and 6. A small pin $o^\times$, Figs. 1 and 3, projecting from the head $w^2$ of the cartridge, enters into a small hole made in the top or end of the recess $h'$, thereby bringing the aperture $w'$ opposite the aperture $w$.

The cartridge can only be reached laterally and by a pointed instrument, so that it can be carried about, handled, and even fall upon a hard body without any danger of explosion.

By arranging the parts of my percussion apparatus in the manner hereinbefore described I obtain a very compact construction and a combination of a percussion with a double-acting disengaging arrangement of very simple construction and absolutely sure in its action.

The disk D produces the double effect by releasing the stud or catch $t$ of the sear either by allowing it to pass through the notch $e$ of the flange $z^3$ or beneath this flange, in which case the disk, while being adapted to rotate, is at the same time arranged to slide in the direction of the longitudinal axis of the fuse.

Before firing, the device T P, Fig. 2, is screwed into the spindle $a$ and the pin $g'$, Figs. 2 and 4$^b$, is removed. The absence or presence of this pin in the fuse indicates whether the projectile fitted with the fuse is ready to be discharged or not. The said pin is provided with a ring for withdrawing it from the fuse. On the discharge of the projectile the plug $m$, Fig. 4$^b$, remaining behind by virtue of its inertia, withdraws the safety-pin $g$.

The impulse due to the discharge does not produce any prejudicial action, either upon the body, and to turn the chamber B on its pivot or base, so as to separate the catch $t$ and notch $e$ by an arc corresponding to the number of revolutions the projectile is to make before exploding, and then to tighten up the screw $b'$.

I am aware that it has been already proposed to employ mechanical fuses utilizing the centrifugal force of a mass to produce the movement of a time mechanism and also to move or withdraw a safety arrangement locking the striker, but I am not acquainted with any construction of mechanical fuse in which centrifugal force has been, or has been capable of being, utilized for causing percussion, that is to say, the final stroke acting on the priming of the projectile, as in my improved fuse.

Having now particularly described and ascertained the nature of my said invention and in what manner the same is to be performed, I declare that what I claim is—

1. In a mechanical fuse, a striker arranged pivotwise in a plane perpendicular to the longitudinal axis of the projectile, substantially as described.

2. In a mechanical fuse, a striker arranged pivotwise in a plane perpendicular to the longitudinal axis of the projectile, and having, in the cocked or set position, its center of gravity outside the radius of the fuse passing through the axis of rotation of the striker and on the side of the said radius toward which the striker should pivot to produce the percussion, substantially as described.

3. In a mechanical fuse, a striker arranged pivotwise in a plane perpendicular to the longitudinal axis of the projectile, the said striker having the form of a two-armed lever one arm of which is provided with a projection and the other with a metal weight by the aid of which the center of gravity of the striker, when in the cocked or set position, is located outside the radius of the fuse, which passes through the axis of rotation of the striker and on that side of the radius which is opposite the point of percussion, substantially as described.

4. In a mechanical fuse, the combination with a striker arranged pivotwise in a plane perpendicular to the longitudinal axis of the projectile, of a restraining disk or plate engaging the striker arranged to slide upon its axis of rotation, substantially as described.

5. In a mechanical fuse, the combination with a striker having the form of a two-armed lever arranged pivotwise in a plane perpendicular to the longitudinal axis of the projectile, and with a restraining-disk arranged to slide upon its axis of rotation, of a sear having the form of a two-armed lever likewise arranged pivotwise in a plane perpendicular to the longitudinal axis of the projectile, the said sear holding the end of one arm of the striker and bearing through the medium of a catch or stud against the restraining-disk, substantially as described.

6. In a mechanical fuse, the combination with a striker arranged pivotwise in a plane perpendicular to the longitudinal axis of the projectile and operated by the centrifugal force of its own mass, of a sear likewise arranged pivotwise in a plane perpendicular to the longitudinal axis of the projectile, but having, in the cocked or set position, its center of gravity on the radius of the fuse passing through its axis of rotation, of the sear, substantially as described.

7. In a mechanical fuse, a striker, and a sear both arranged pivotwise in a plane perpendicular to the longitudinal axis of the projectile, the said striker and sear being supported upon the floor of the body of the fuse, substantially as described.

8. In a mechanical fuse, a striker and a sear both arranged pivotwise in a plane perpendicular to the longitudinal axis of the projectile, and having their centers of rotation on the circumference of the floor of the body of the fuse, substantially as described.

9. In a mechanical fuse, a striker and a sear both having the form of a two-armed lever and arranged to pivot upon axes of rotation situated on the circumference of the floor of the body of the fuse, the arms of the said striker and the said sear being curved to correspond to the two extreme positions that these parts should occupy against the inner wall of the chamber of the fuse, substantially as described.

10. In a mechanical fuse, a striker arranged to pivot in a plane perpendicular to the longitudinal axis of the projectile upon an axis situated near the circumference of a floor and having an arm loaded with a weight, the said arm being formed on one side by the arc of a circle, the center of which is coincident with the point or projection of the striker and on the other side by a straight line coincident, when the striker is in the set or cocked position, with the radius of the fuse passing through the axis of rotation of the striker, this straight line being broken by a semicircular recess corresponding to the contour of a central projection or boss on the floor of the body of the fuse, substantially as described.

11. In a mechanical fuse, the combination with a striker and a sear both adapted to pivot in a plane perpendicular to the longitudinal axis of the projectile, of a revoluble restraining-disk adapted to slide along its axis of rotation, the said disk comprising two plates connected by a truncated cone, one of these plates being attached to a toothed wheel and the other being provided with a flange against which the stud or catch of the sear can rest, substantially as described.

12. In a mechanical fuse, the combination with a striker and a sear arranged to pivot in a plane perpendicular to the longitudinal axis of the projectile, of a revoluble restraining disk or plate provided with a toothed wheel and with a flange, a notch in this flange for the release of the catch or stop of the sear, of a projecting catch above this notch and of a stop projecting into the chamber of the fuse for establishing the initial position of the disk, substantially as described.

13. In a mechanical fuse, the combination with a striker and a sear arranged to pivot in a plane perpendicular to the longitudinal axis of the projectile, of a revoluble restraining disk or plate provided with a toothed wheel and adapted, at the moment the projectile strikes the earth or an object, to slide forward with this wheel upon their axis of rotation, of a spring pressing on the bottom of the chamber of the fuse and normally holding back the disk and its wheel, substantially as described.

14. In a mechanical fuse the combination with the striker and the sear, of a revoluble restraining-disk provided with a toothed wheel and arranged to slide upon its axis of rotation, the said disk being adapted to be supported at the moment of the discharge of the projectile upon a large head with which its axis is provided, as well as upon the upper surface of a central projection or boss on the floor of the body of the fuse, substantially as described.

15. In a mechanical fuse, the combination with a striker arranged to pivot in a plane perpendicular to the longitudinal axis of the projectile, of a removable cartridge having a lateral opening at the bottom in which is arranged a priming, the said opening corresponding with a percussion-aperture formed laterally in a central projection or boss on the floor and arranged in the arc of a circle through which the point or projection of the striker passes, substantially as described.

16. In a mechanical fuse, the combination with the striker having the form of a two-armed lever arranged to pivot in a plane perpendicular to the longitudinal axis of the fuse, of a deflected spring bearing upon one arm of the striker, substantially as described.

17. In a mechanical fuse the combination of a striker arranged to be acted upon by the centrifugal force of its own mass, of a sear adapted to lock the striker in the cocked position, the said striker and the said sear pivoting on the floor of the body of the fuse, of a revoluble restraining disk or plate provided with a toothed wheel arranged to slide on its axis of rotation, and held by a spring upon a support having a large surface, the said disk being provided with a flange adapted to support the catch or stud forming a projection upon the sear, and of a cartridge, the priming of which is located at the bottom of a lateral opening behind the lateral percussion-aperture formed in the central boss, projecting from the floor of the body of the fuse, substantially as described.

In testimony whereof I have signed this specification in the presence of two subscribing witnesses.

FÉLICIEN MAUBEUGE.

Witnesses:
GREGORY PHELAN,
GEORGE BEDE.